(12) United States Patent
Brewer

(10) Patent No.: US 7,036,943 B1
(45) Date of Patent: May 2, 2006

(54) BINOCULAR COVER

(75) Inventor: Edwin F. Brewer, 13708 Hackamore Cir., Draper, UT (US) 84020

(73) Assignee: Edwin F. Brewer, Draper, UT (US)

( * ) Notice: Subject to any disclaimer, the term of this patent is extended or adjusted under 35 U.S.C. 154(b) by 0 days.

(21) Appl. No.: 11/010,918

(22) Filed: Dec. 14, 2004

(51) Int. Cl.
*G02B 23/16* (2006.01)

(52) U.S. Cl. ............ 359/511; 359/407; 224/637; 224/909

(58) Field of Classification Search ........ 359/407–409, 359/480–482, 507–511, 800–830; 224/908–909, 224/259, 604–655

See application file for complete search history.

(56) References Cited

U.S. PATENT DOCUMENTS

| 3,782,614 | A | * | 1/1974 | Campisi | 2/251 |
| 5,016,797 | A | * | 5/1991 | Rowledge | 224/257 |
| 5,320,261 | A | * | 6/1994 | Andersen | 224/194 |
| 5,816,464 | A | * | 10/1998 | Seiler | 224/615 |
| 6,926,184 | B1 | * | 8/2005 | Hancock et al. | 224/637 |

* cited by examiner

*Primary Examiner*—Thong Q Nguyen

(57) ABSTRACT

A binocular cover comprising a cover sheet that overlies an exposed face of a binocular carried at the chest of a user by a neck strap, a substantially rigid top cover fixed to and projecting from one end of the cover sheet to overlie the eyepieces of the binocular, and an elastic strip interconnecting wings at opposite sides of the top cover and pull tabs affixed to the top cover to be used to peel the top cover from over the eyepieces and downwardly towards a distal end of the binocular positioned between the elastic strap, a back surface of the cover sheet and the wings.

3 Claims, 3 Drawing Sheets

Figure 4:
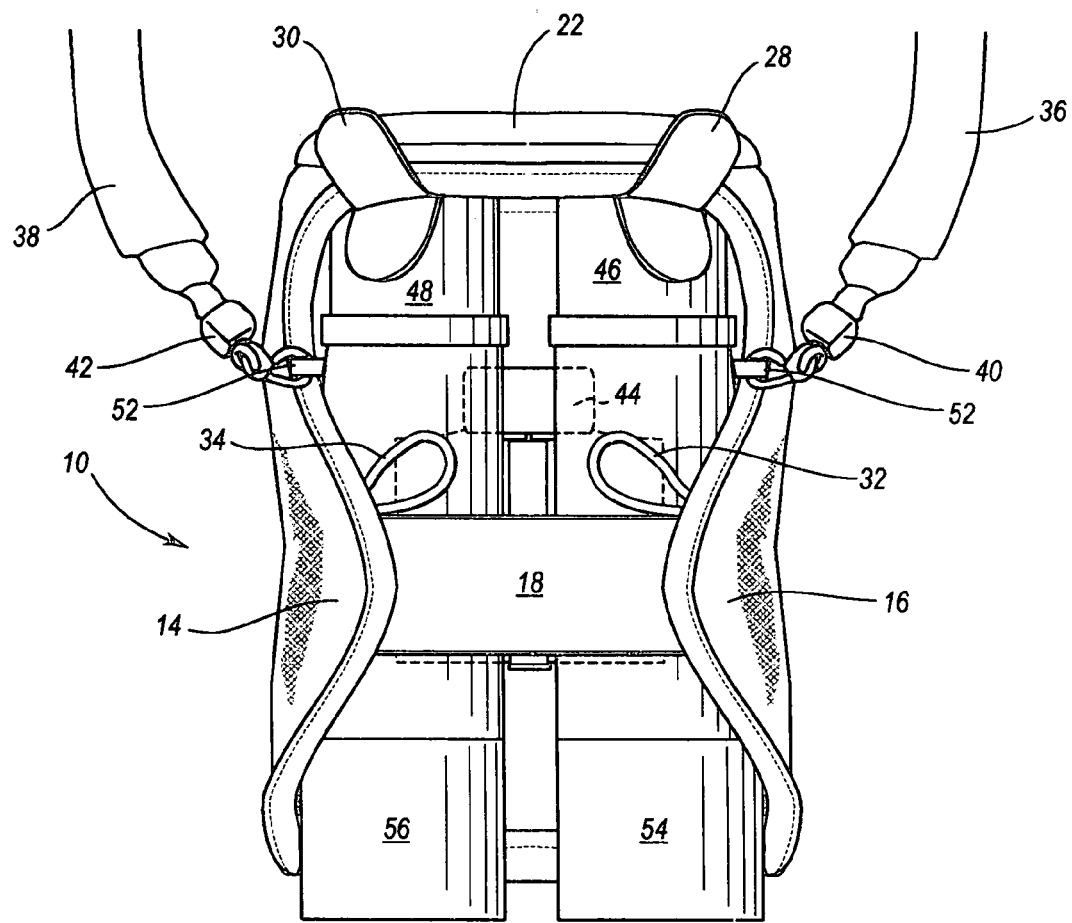

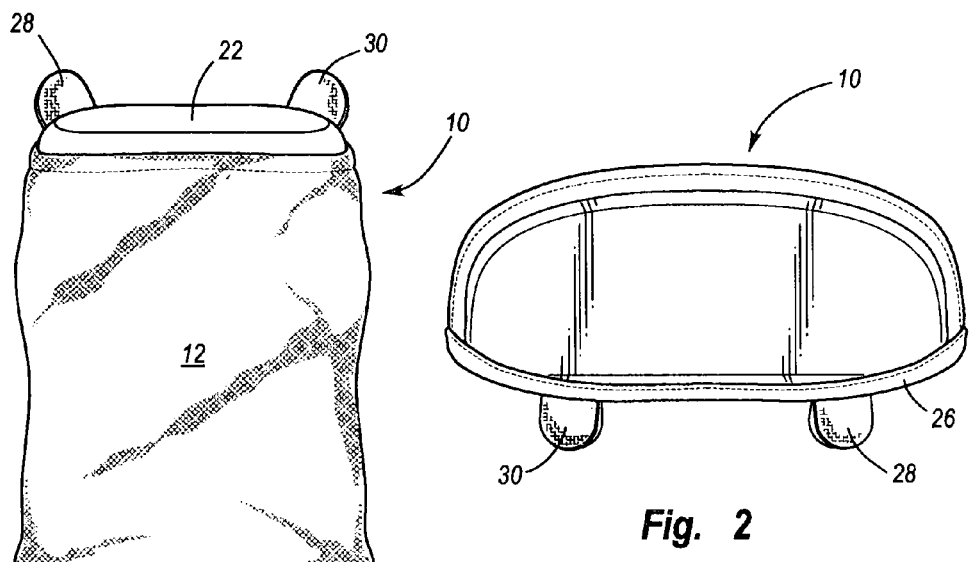
Fig. 1
Fig. 2
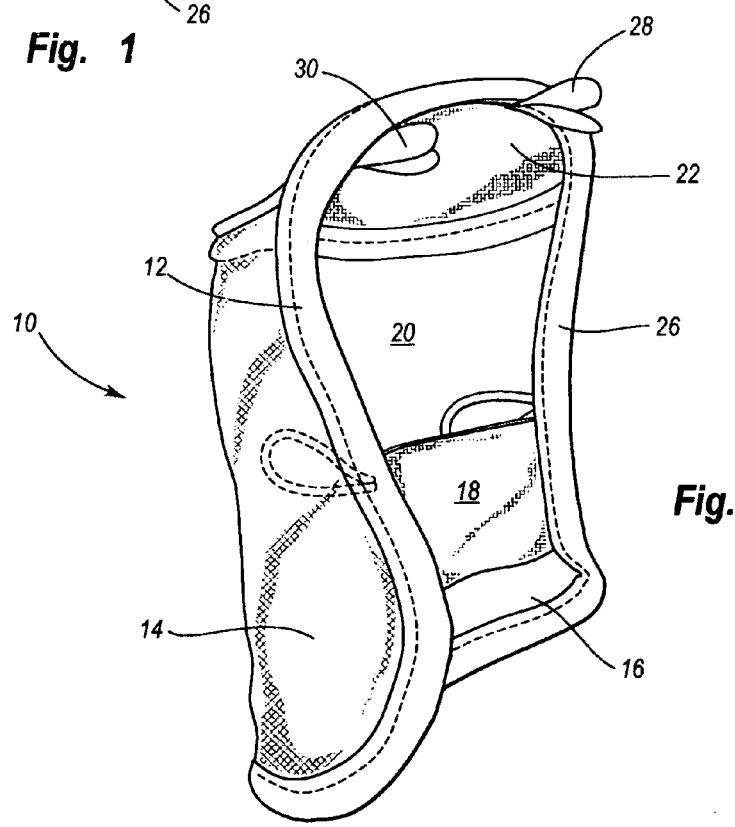
Fig. 3

BINOCULAR COVER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Field of the Invention

This invention relates to apparatus for protecting binoculars and is particularly concerned with protecting binoculars that are suspended from the neck of a user.

There are a number of cases, packs, or other types of structures currently commercially available for holding binoculars in place against the chest of a user. The structures provided for holding such binoculars generally include straps, or harnesses, that will position the structure at the front of a user's chest. Such structures generally require that the binoculars be removed from the structure to be used by an individual.

It has been found, however, that a need remains for a cover to prevent fogging of the eyepieces of the binoculars and that will protect the exposed housing of binoculars suspended in front of a user's chest.

BRIEF SUMMARY OF THE INVENTION

Objects of the Invention

Principal objects of the invention are to provide a cover for binoculars that will effectively protect the binocular eyepieces against weather conditions and against becoming fogged while suspended in front of a user's chest and that will also keep moisture and destructive sunlight away from the portions of a binocular that are remote from a user's chest.

Other features are to provide a protective cover that is easily produced, economically produced and that can be used with virtually any strap or harness system available for the purpose of positioning a binocular in front of a user's chest.

FEATURES OF THE INVENTION

Principal features of the invention include a protective front cover sheet that will overlie the exposed portions of binoculars being protected and that are supported adjacent to the chest of a user. The cover sheet extends from a location adjacent to the eyepieces of the suspended binocular and downwardly toward a location at, or adjacent to, the distal ends of the binoculars remote from the eyepieces. The protective cover sheet includes side wings that will wrap at least partially around sides of the binoculars and an elastic member that will connect the side wings to bias them towards one another and that will secure the cover to the binoculars. A top cover is connected to an end of the cover sheet adjacent to the eyepieces and the top cover is hingedly connected to the cover sheet such that the top cover will extend over the eyepieces of the binocular. A flexible connection between the top cover and the cover sheet allows the top cover to be pivoted from over the eyepieces of the binocular and to be held in position out-of-the way of the eyepieces as the binocular and binocular cover is raised to be used by a user person.

Flexible tabs are attached to the top cover to assist a user in flipping the top cover off, from over the eyepieces, to a position where the top cover does not obstruct view through the eyepieces.

Flexible connection loops are provided at opposite sides of the wings for attachment of a support structure to be used in holding binoculars in position in front of the chest of a user. The support structure may include a simple neck strap or may include a harness fitting over the neck and shoulders of a user and around the arms of a user to more securely hold the binoculars in place.

In using the protective cover, a user pivots the top cover from its position extending over the eyepiece of the binocular to the out-of-the way position. The binocular is then raised to the eyes of a user, with the protective cover, in place, attached to the binocular.

Various kinds of harnesses and carriers have been developed in the past as a means of holding items to the chest of a user. Such harnesses and carriers often utilize a neck strap for suspending a binocular or camera at the chest of a user.

The known harnesses used in the past often have a harness including straps that will pass over the shoulders of a user, crossing at the back of the user and passing beneath the arms of the user to come together at the front of the user. Separate hold-down strap means are connected to the harness to extend across the front of the user and to pass over and hold down binoculars or cameras to the chest of the user. The binoculars or cameras so secured are removed from the hold-down straps for use and then are returned for carrying purposes.

Another known harness supports a pouch in which binoculars are placed and from which the binoculars are removed for use, even as the binocular remains attached to the harness.

Still another harness supports a camera at the chest of a user. The camera is raised along with an article holder to which a camera is attached.

Additional objects and features of the invention will become apparent to persons skilled in the art to which the invention pertains from the following detailed description and claims.

BRIEF DESCRIPTION OF THE FIGURES OF THE INVENTION

In the Drawings

Figure 5:
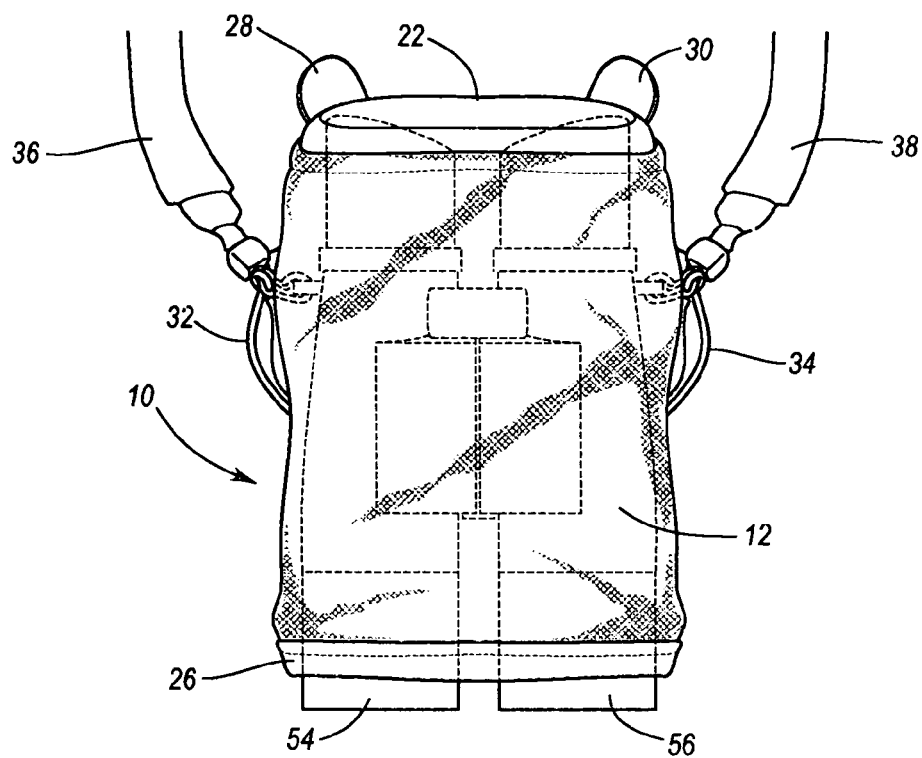
Figure 6:
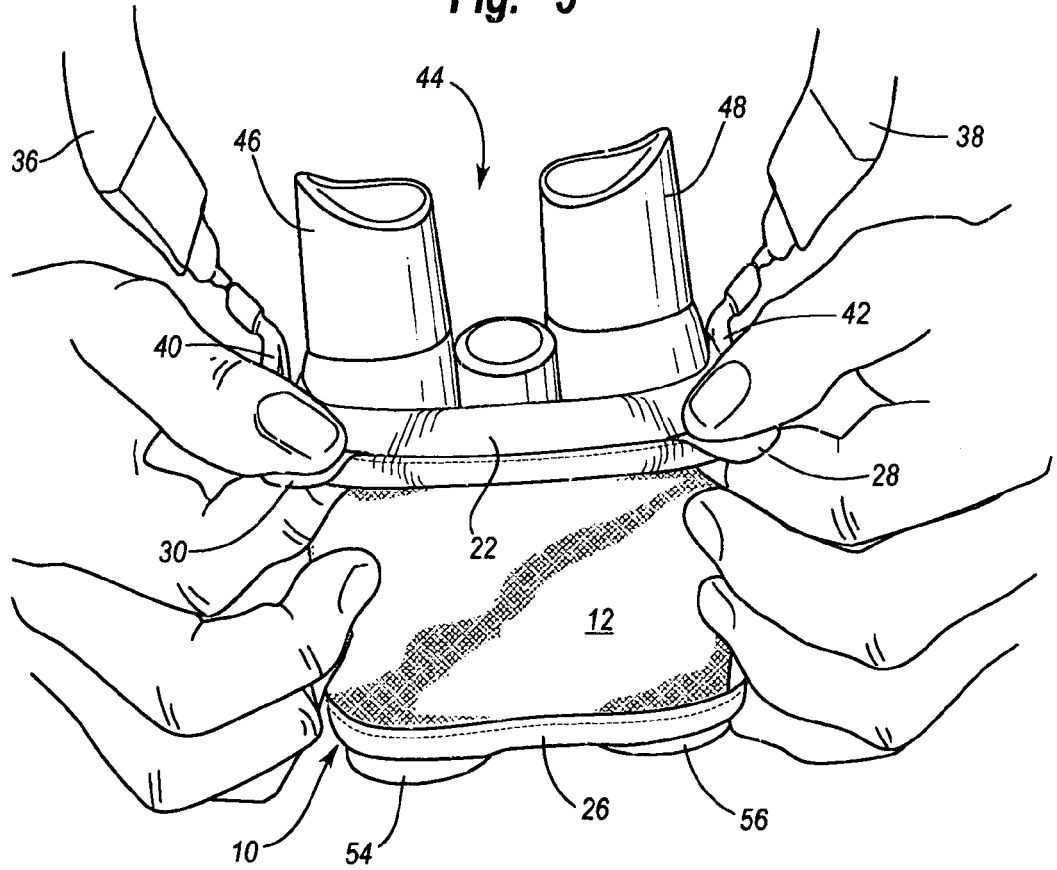

FIG. 1 is a front elevation of the binocular cover of the invention;

FIG. 2, a top plan view of the binocular cover of FIG. 1;

FIG. 3, a perspective view of the binocular cover, taken from one side and above;

FIG. 4, an enlarged rear elevation view of the binocular cover;

FIG. 5, a front elevation view showing attachment of the binocular cover to supporting straps; and FIG. 6, a pictorial view showing how the top cover is peeled back and down from the eyepieces of a covered binocular.

DETAILED DESCRIPTION

Referring Now the Drawings

In the illustrated preferred embodiment, the binocular cover of the invention is shown generally at 10. Cover 10 includes a cover sheet 12 that is made of flexible, preferably waterproof material. The cover sheet 12 includes side wings 14 and 16 that are interconnected by an elastic strap 18 that extends straight between the wings.

The wings 14 and 16 extend from a connection with the flexible cover sheet 12 at the sides thereof to extend partially across the back surface 20 of the flexible sheet 12 and the elastic strap 18 holds the outermost edges of the wings towards one another.

A generally oval shape top cover 22 is affixed to an upper edge of the flexible cover sheet 12.

The top cover 22 projects forwardly from the top edge of flexible cover sheet 12 and a rolled edge 26 of the flexible cover sheet 12 extends around the entire edge of the cover sheet, including around the wings 14 and 16 and the top cover 22.

Top cover 22 is made of a somewhat flexible, substantially rigid, plastic material, or the like, and, as will be further explained, will extend over the eyepieces of a binocular. A pair of spaced apart tabs 28 and 30 are fixed to and project from the rearmost edge of the top cover 22.

Loops 32 and 34 are respectively provided at opposite ends of the elastic strap 18 and are sewn to the peripheral rolled turn back edge 26.

The binocular cover 10 of the invention is used as shown best in FIGS. 4–6. A binocular 44 is inserted into the binocular cover 10 by stretching elastic strap 18 and sliding the binocular down between the cover sheet 12, the wings 14 and 16, and elastic strap 18 until the top cover 22 will extend over the eyepieces 46 and 48 of the binocular.

The ends 40 and 42 of support straps 36 and 38, which may be opposite ends of a single neck strap, or may be ends of individual support straps forming a portion of a support harness, are attached to the loops 32 and 34 and to attachment rings 52 provided at the sides of the binocular. Cover sheet 12 extends from beneath the eyepieces 46 and 48 to adjacent the distal ends 54 and 56 of the binocular 44 and protects the otherwise exposed surface of the binocular.

With the binocular in the binocular cover and attached to the supporting straps, the binocular is carried at the front chest of a user. With top cover 22 peeled away, the binocular can be raised and the user can look into and through the eyepieces and through the distal ends. During such use, the binocular cover 10 remains attached to the binocular. The turned back edge 26 helps to hold the top cover in the peeled back position.

Although a preferred embodiment of my invention has been herein described, it is to be understood that the present disclosure is by way of example and that variations are possible without departing from the subject matter coming within the scope of the following claims, which subject matter I regard as my invention.

I claim:

1. A binocular cover comprising
    a cover sheet of durable flexible material sized to just overlie a front portion of a binocular between the eyepieces and the distal end, and having wings extending from opposite sides to extend around the opposite sides of the binocular;
    an elastic strap interconnecting the outermost edges and intermediate the length of the wings, said elastic strap holding said wings to extend towards one another;
    a substantially rigid top cover connected to a top edge of said flexible cover sheet and projecting away from said flexible cover sheet; and
    a turned back edge of said sheet of durable flexible material, said edge extending fully around said cover sheet and said top cover, whereby said top cover is pivotable along said turned back edge from over eyepieces of a binocular a position defined by said cover sheet, said wings and said elastic strap.

2. A binocular cover as in claim 1, further including a pair of spaced apart, flexible loops each fixed to an opposite side of the cover sheet adjacent a wing thereof; and
    a neck strap to extend behind the neck of a user and having opposite ends each attached to one of said flexible loops.

3. A binocular cover as in claim 2, further including
    spaced apart pull tabs fixed to and projecting from a side of the top cover remote from the connection of said top cover with said cover sheet.

\* \* \* \* \*